United States Patent
Li et al.

(10) Patent No.: US 10,318,046 B2
(45) Date of Patent: Jun. 11, 2019

(54) DISPLAY PANEL

(71) Applicants: Shanghai Tianma Micro-electronics Co., Ltd., Shanghai (CN); Tianma Micro-electronics Co., Ltd., Shenzhen (CN)

(72) Inventors: Gujun Li, Shanghai (CN); Liang Liu, Shanghai (CN); Yan Shen, Shanghai (CN)

(73) Assignees: Shanghai Tianma Micro-electronics Co., Ltd., Shanghai (CN); Tianma Micro-electronics Co., Ltd., Shenzhen (CN)

(*) Notice: Subject to any disclaimer, the term of this patent is extended or adjusted under 35 U.S.C. 154(b) by 288 days.

(21) Appl. No.: 15/209,931

(22) Filed: Jul. 14, 2016

(65) Prior Publication Data
US 2017/0329448 A1   Nov. 16, 2017

(30) Foreign Application Priority Data

May 13, 2016 (CN) .......................... 2016 1 0318919

(51) Int. Cl.
*G06F 3/041* (2006.01)
*G06F 3/045* (2006.01)
*G06F 3/044* (2006.01)

(52) U.S. Cl.
CPC ............ *G06F 3/0416* (2013.01); *G06F 3/044* (2013.01); *G06F 3/045* (2013.01); *G06F 3/0412* (2013.01); *G06F 3/0414* (2013.01); *G06F 2203/04105* (2013.01); *G06F 2203/04107* (2013.01); *G06F 2203/04111* (2013.01)

(58) Field of Classification Search
CPC ................... G06F 3/0414; G06F 3/044; G06F 2203/04105
See application file for complete search history.

(56) References Cited

U.S. PATENT DOCUMENTS

| 2013/0222306 A1* | 8/2013 | Aberg ..................... G06F 1/206 345/173 |
| 2015/0091859 A1* | 4/2015 | Rosenberg .............. G06F 3/044 345/174 |
| 2016/0276071 A1* | 9/2016 | Hsieh ..................... H01C 13/02 |
| 2017/0285864 A1* | 10/2017 | Pedder .................. G06F 3/0412 |

FOREIGN PATENT DOCUMENTS

| CN | 105181217 A | 12/2015 |
| CN | 105404432 A | 3/2016 |

* cited by examiner

*Primary Examiner* — Amr A Awad
*Assistant Examiner* — Stephen A Bray
(74) *Attorney, Agent, or Firm* — Anova Law Group, PLLC

(57) ABSTRACT

A display panel is provided. The display panel includes a first substrate; a second substrate arranged in opposite to the first substrate; and at least one group of force sensing modules. Each force sensing module include a plurality of force-sensitive units, and each force-sensitive unit includes at least two force-sensitive resistors disposed on different layers.

13 Claims, 8 Drawing Sheets

DISPLAY PANEL

CROSS-REFERENCES TO RELATED APPLICATIONS

This application claims priority of Chinese Patent Application No. 201610318919.4, filed on May 13, 2016, the entire contents of which are hereby incorporated by reference.

FIELD OF THE INVENTION

The present disclosure generally relates to the field of display technology and, more particularly, relates to a display panel that realizes touch-control function in a capacitive display panel.

BACKGROUND

As an input device, a touch screen is so far the easiest, most convenient and natural method for human-computer interaction. Display devices integrated with a touch-control function have been a research hotspot among growing flat panel display manufacturers.

FIG. 1 is a top view of a typical mutual capacitive display panel. As shown in FIG. 1, a display panel 10A comprises a plurality of scanning lines 122 extending along an X direction, a plurality of data lines 124 extending along a Y direction, a plurality of drive electrodes 101 arranged in an array along both X direction and Y direction, and a plurality of sense electrodes 103 arranged along the X direction. In particular, the drive electrodes 101 and the sense electrodes 103 are perpendicularly distributed. The drive electrodes 101 are connected to a control unit 108 via touch-control drive electrode lines 107, the sense electrodes 103 are connected to the control unit 108 via touch-control sense electrode lines 109, and the control unit 108 inputs a touch-control drive signal to the touch-control drive electrodes 101 via the touch-control drive electrode lines 107. When touched by a finger, the capacitance at each crossing position between the drive electrodes 101 and the sense electrodes 103 varies, and the capacitance change signal of the touch-control sense electrodes 103 is received via the touch-control sense electrode lines 109, so as to determine a touch position.

As shown in FIG. 1, the drive electrodes 101 and the sense electrode 103 are disposed on a same layer. To avoid a short circuit caused by overlapping of the drive electrodes 101 and the sense electrodes 103, the drive electrodes 101 disposed on a same line are connected to each other via metal bridges 105.

FIG. 2 is a top view of a typical current self-capacitive display panel. As shown in FIG. 2, a display panel 10B comprises a plurality of scanning lines 126 extending along the X direction, a plurality of data lines 128 extending along the Y direction, a plurality of touch-control block electrodes 104 arranged in an array both along the X direction and the Y direction, each touch-control block electrode 104 is connected to a control unit 110 via touch-control lines 106.

Different from the working principle of the mutual capacitive display panel 10A, the touch-control block electrodes 104 in the self-capacitive display panel 10B are both touch-control drive electrodes and touch-control sense electrodes, and the control unit 110 provides an input touch-control drive signal for the touch-control electrodes 104 via the touch-control electrode lines 106. When touched by a finger, the capacitance of the touch-control electrodes 104 changes, this kind of change can be detected via touch-control electrodes 104 in order to determine a touch position. As shown in FIG. 2, to avoid signal interference between the touch-control electrodes 104 and the touch-control electrode lines 106, the touch-control electrodes 104 and the touch-control electrode lines 106 are disposed on different film layers and are connected via through-holes 108.

Neither the mutual capacitive display panel shown in FIG. 1 nor the self-capacitive display panel shown in FIG. 2 is integrated with a force or pressure touch-control function. The so-called force or pressure touch-control means that, when pressures or forces applied by a finger are different, the display panel generates different sensing signals based on different pressures to execute corresponding operational instructions.

Currently, there are two major types of force touch functions in display panels: resistive force touch and capacitive force touch. In particular, the resistive force touch is highly valued in industry due to its high sensitivity and low cost. In current resistive touch display panels, a strain gauge is disposed under a backlight layer of a display panel or is disposed around the border of the display panel.

When a strain gauge is disposed under the backlight layer of a display panel, the thickness of the display panel increases, which is not beneficial to the thinning of the display panel. Meanwhile, since the strain gauge is disposed under the backlight layer, the sensitivity of finger touch is largely weakened, thus lowering the touch-control sensitivity. When a strain gauge is disposed around the border of a display panel, since the border of the display panel is primarily affixed using double-faced adhesive tapes, there is often a gap between the double-faced adhesive tape and the display panel that reduces deformation induced by a force applied on the surface of the display panel, which can lower the accuracy of force touch.

BRIEF SUMMARY OF THE DISCLOSURE

One aspect of the present disclosure provides a display panel. The display panel includes a first substrate; a second substrate arranged in opposite to the first substrate; and at least one group of force sensing modules. Each force sensing module include a plurality of force-sensitive units, and each force-sensitive unit includes at least two force-sensitive resistors disposed on different layers.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined or separated under conditions without conflicts.

Figure 1:
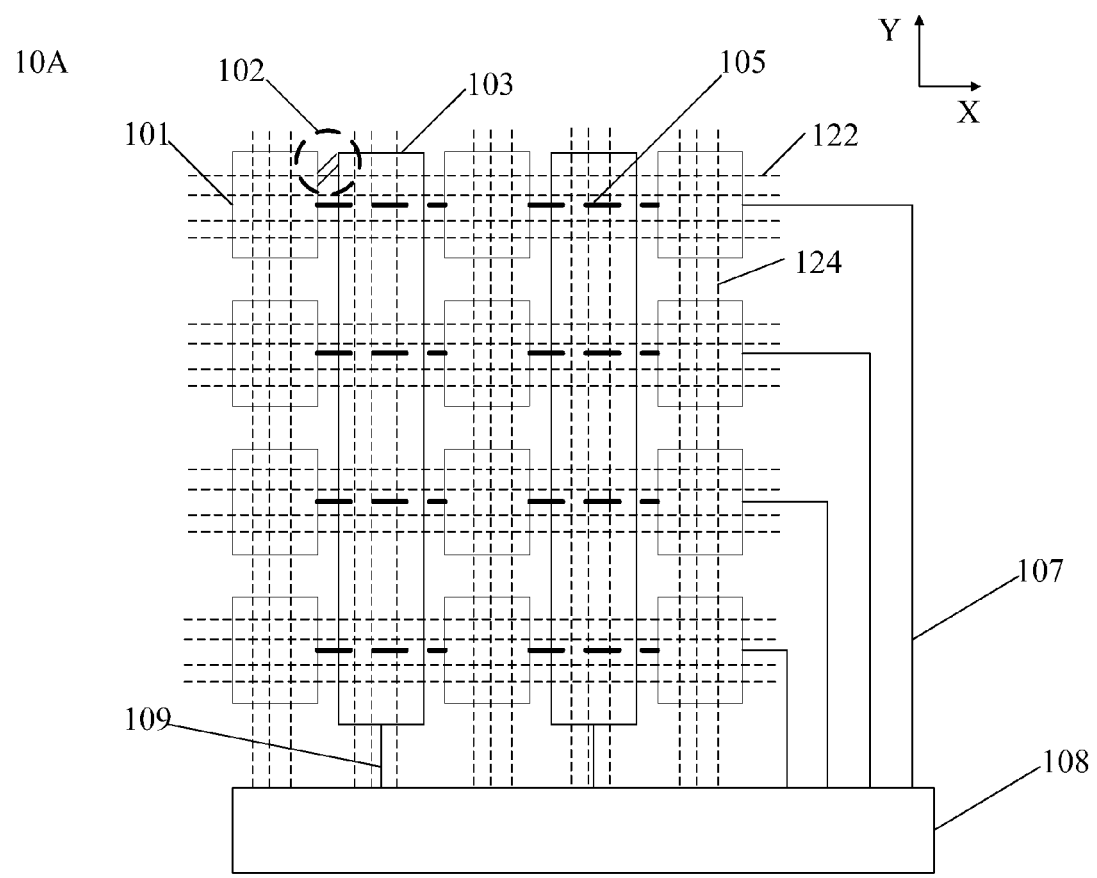
FIG. 1 illustrates an existing mutual capacitive display panel.
Figure 2:
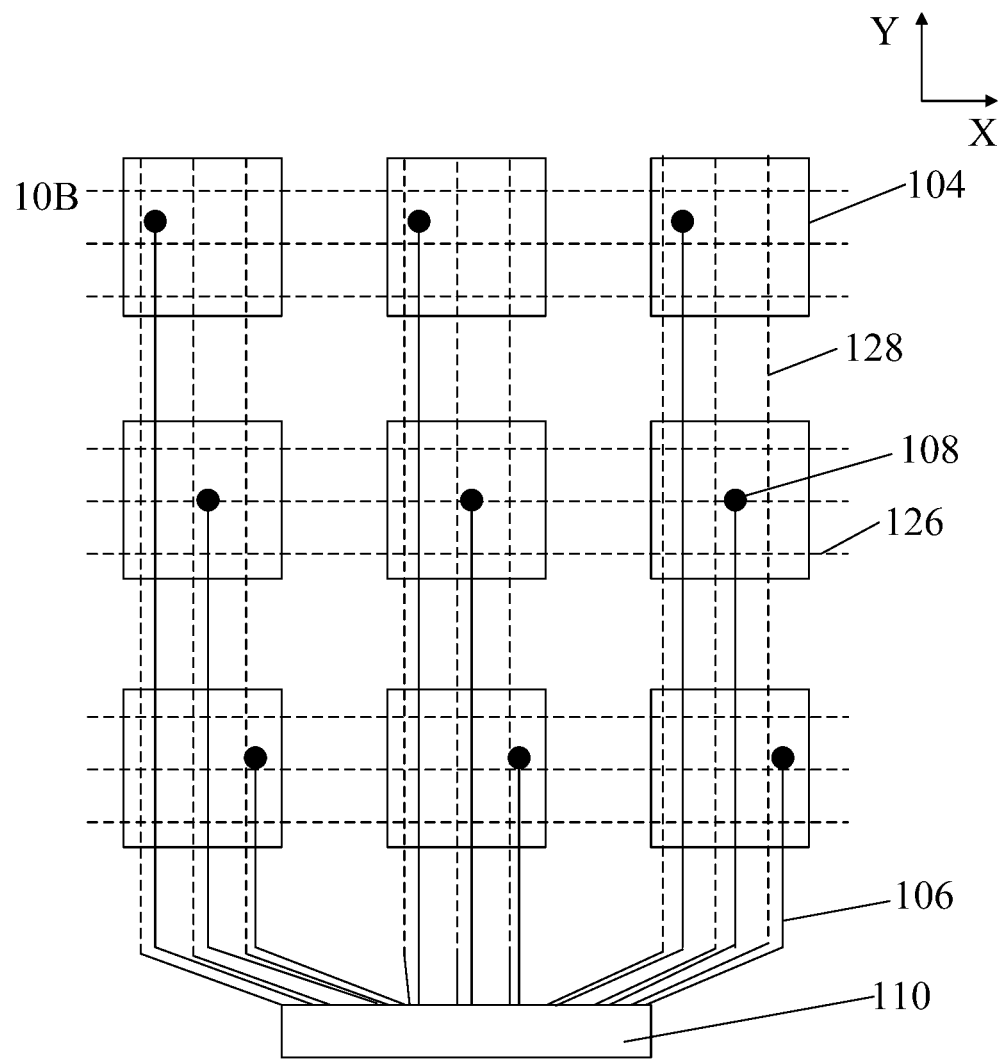
FIG. 2 illustrates an existing self-capacitive display panel.
Figure 3:
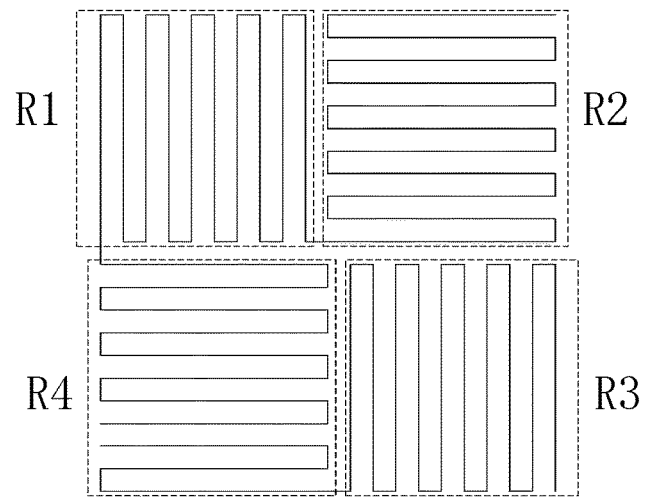
FIG. 3 illustrates a bridge in an existing strain gauge.

FIG. 3 shows a bridge in an existing strain gauge. As shown in FIG. 3, all members of the bridge are fabricated on a same layer. The bridge requires that R1 and R2 (R3 and R4) have different deformations, for instance, R1 (R3) has compressive deformation, and R2 (R4) has tensile deformation. In reality, R1 and R2 (R3 and R4) may be necessarily and spatially separated. Then, when a local temperature in a display panel changes, for instance, the temperature of a local area touched by a finger increases, R1 and R2 (R3 and R4) may have different temperatures. Thus, it may be difficult for the bridge to compensate for the temperature change, and the practicability of such resistive pressure sensitive sensor may be affected.

For example, in a 5-inch HD display panel, many bridges may be arranged in an array. When the resistance of a strain gauge is 50 kΩ, and the resistance of metal is 5Ω, to realize the design of a desired bridge, the length or width of a single bridge disposed on a same layer may reach 4-5 mm or more. Therefore, the influence of the spatial temperature difference cannot be neglected. However, currently, bridge resistors are disposed on the same layer and, thus, the overall dimension of the bridge can be reduced significantly.

Figure 4:
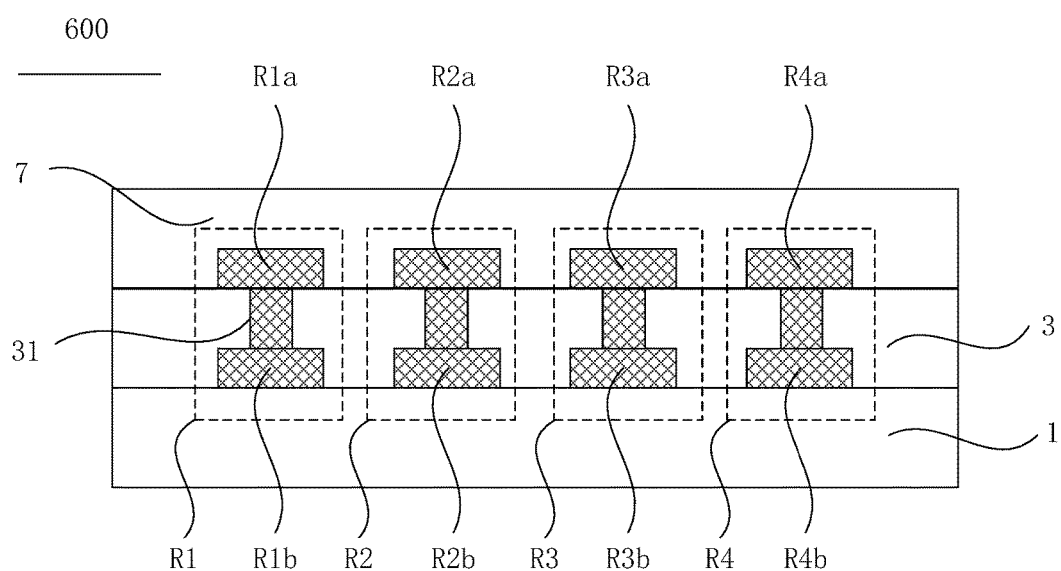
FIG. 4 illustrates an exemplary bridge in a strain gauge of a display panel consistent with disclosed embodiments.
Figure 5:
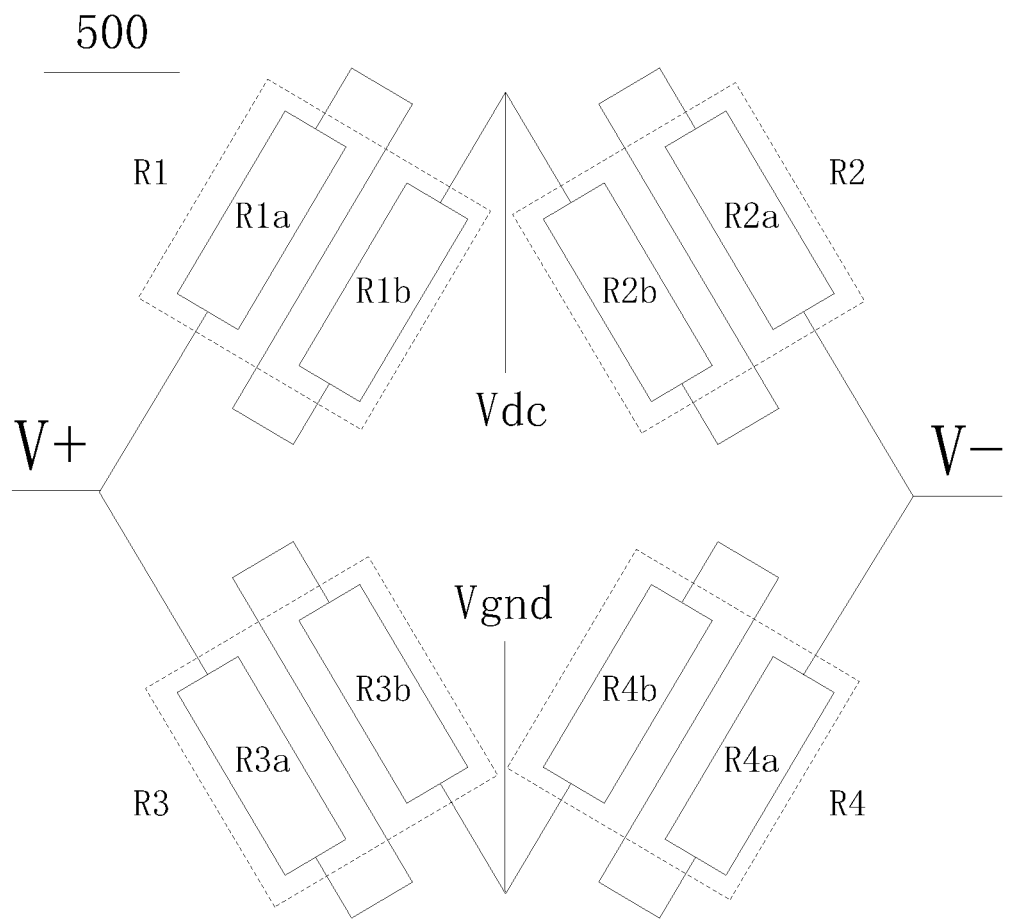
FIG. 5 illustrates a circuit diagram for an exemplary bridge in FIG. 4 consistent with disclosed embodiments.

The present disclosure provides an improved strain gauge structure. FIG. 4 illustrates an exemplary bridge in a strain gauge of a display panel consistent with the disclosed embodiments. FIG. 5 is the circuit diagram of the bridge in FIG. 4.

As shown in FIG. 4 and FIG. 5, a strain gauge 600 is provided, which can be affixed on one side of a display panel. The strain gauge 600 may include a first substrate 1, an insulation layer 3, a second substrate 7, and a force sensing module 500. Other components may also be included.

The second substrate 7 and the first substrate 1 may be oppositely arranged, and the force sensing module 500 may be disposed between the first substrate 1 and second substrate 7. The force sensing module 500 may include a plurality of force-sensitive units.

For example, the force sensing module 500 may include a first force-sensitive unit R1 (a combination of R1a+R1b), a second force-sensitive unit R2 (a combination of R2a+R2b), a third force-sensitive unit R3 (a combination of R3a+R3b), and a fourth force-sensitive unit R4 (a combination of R4a+R4b). In particular, the force-sensitive resistor R1a, the force-sensitive resistor R2a, the force-sensitive resistor R3a, and the force-sensitive resistor R4a may all be disposed on a first force-sensitive resistor layer. The force-sensitive resistor R1b, the force-sensitive resistor R2b, the force-sensitive resistor R3b, and the force-sensitive resistor R4b may all be disposed on a second force-sensitive resistor layer.

The first force-sensitive resistor layer and the second force-sensitive resistor layer may be disposed on two sides of an insulation layer 3, respectively, and the force-sensitive resistors (R1a, R2a, R3a, and R4a) on the first force-sensitive resistor layer may be individually connected to the corresponding force-sensitive resistors (R1b, R2b, R3b, and R4b) on the second force-sensitive resistor layer via through-holes 31 on the insulation layer 3, thus forming force-sensitive units (i.e., bridge arms of the bridges) of the force sensing module 500 (i.e., bridge), respectively.

In certain embodiments, a strain gauge may also include a force sensing circuit that is electrically connected to the force sensing module 500. The force sensing circuit may determine the total force on a particular force-sensitive unit based on the sum of the force corresponding to the in-plane deformation experienced by the force-sensitive resistor (e.g., force-sensitive resistor R1a, R2a, R3a, or R4a) on the first force-sensitive resistor layer and the force corresponding to the in-plane deformation of the corresponding force-sensitive resistor (e.g., force-sensitive resistor R1b, R2b, R3b, or R4b) on the second force-sensitive resistor layer. For example, the force sensing circuit may be a piezoelectric transducer circuit electrically connected to the force sensing module.

In one embodiment, the first force-sensitive unit R1, the second force-sensitive unit R2, the third force-sensitive unit R3, and the fourth force-sensitive unit R4 may form a bridge, as shown in FIG. 5.

Accordingly, in the disclosed bridge structure of the display panel, each force-sensitive unit in the force sensing module 500 may be divided into at least two resistors, and each resistor may be disposed on a different layer, thus forming a layered or stacked resistor structure. In the disclosed embodiments, a force-sensitive unit R1 (a force-sensitive resistor) on a single layer may be divided into two force-sensitive resistors R1a and R1b on different layers. A force-sensitive resistor R2 may be divided into two force-sensitive resistors R2a and R2b on different layers. A force-sensitive resistor R3 may be divided into two force-sensitive resistors R3a and R3b on different layers. And a force-sensitive resistor R4 may be divided into two force-sensitive resistors R4a and R4b on different layers.

To reduce the influence of the spatial temperature, the dimension of force sensing module in the disclosed embodiments may be significantly small because of the stacked structure. When the dimension of a force sensing module is smaller than half of the area touched by a finger, the overall temperature at the area touched by the finger may approximately show no apparent variance.

Because the area of the overall bridge structure is significantly small, i.e., the areas of the force-sensitive units R1 and R2, R3 and R4 are significantly small so that the force sensing module can be regarded as a touch point compared to the area of a finger. No matter how a finger touches a screen, either all force-sensitive units in the force sensing module (bridge) are touched or the all force-sensitive units are not touched. Therefore, a two-layered structure similar to R1a and R1b may achieve a reduced area in comparison to the current one-layer force-sensitive unit R1 (force-sensitive resistor), leading to a reduced area occupied by force-sensitive units in the bridge structure. Under this condition, the force-sensitive units R1 and R2, R3 and R4 may have the same temperature change, and the output voltage may have less or no variance.

In certain embodiments, a force sensing module may include a bridge formed by the first force-sensitive unit R1 (a combination of R1a+R1b), the second force-sensitive unit R2 (a combination of R2a+R2b), the third force-sensitive unit R3 (a combination of R3a+R3b), and the fourth force-sensitive unit R4 (a combination of R4a+R4b). The bridge may be a Wheatstone bridge. A first end of the first force-sensitive unit R1 may be connected to a first end of the second force-sensitive unit R2 as well as a first end of a galvanometer; a first end of the fourth force-sensitive unit R4 may be connected to a first end of the third force-sensitive unit R3 and a second end of the galvanometer; a second end of the first force-sensitive unit R1 and a second end of the fourth force-sensitive unit R4 may be connected together as a first output; and a second end of the second force-sensitive unit R2 and a second end of the third force-sensitive unit R3 are connected together as a second output. Other connecting structures may also be used.

Further, vertical projections of the force-sensitive resistors in a same force-sensitive unit on different layers may have the same texture, shape, and dimension, etc. The corresponding force-sensitive resistors in different layers may also have the same resistance. Alternatively, the vertical projections of force-sensitive resistors (force-sensitive resistors R1a, R2a, R3a, R4a) on the first force-sensitive resistor layer and the corresponding force-sensitive resistors (force-sensitive resistors R1b, R2b, R3b, R4b) on the second force-sensitive resistor layer may have different shapes and dimensions.

In one embodiment, the force-sensitive resistors on the first force-sensitive resistor layer and the corresponding force-sensitive resistors on the second force-sensitive resistor layer (i.e., R1a and R1b) may be at least partially overlapped, or completely overlapped, in order to reduce the area of a force-sensitive unit. The larger the overlapped area between the force-sensitive resistors is, the smaller the area of the force-sensitive unit may be.

Figure 6:
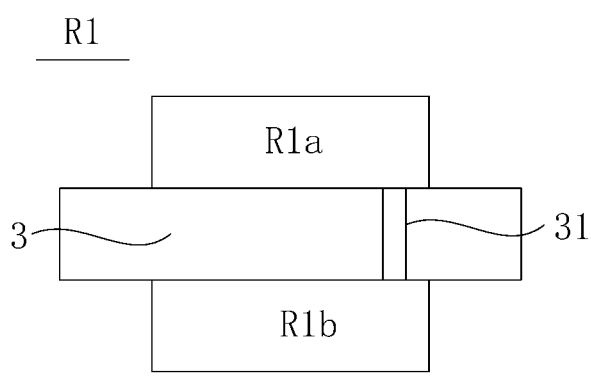
FIG. 6 illustrates an exemplary single force-sensitive unit in FIG. 5 consistent with disclosed embodiments.

FIG. 6 is a cross-sectional view of a single force-sensitive unit shown in FIG. 5. As shown in FIG. 6, R1 (R2/R3/R4 shows the same layered structure) may be designed into two overlapped metal layers R1a and R1b connected in series, and an insulation layer 3 may be disposed in between. The series connection of the force-sensitive resistor R1a and the force-sensitive resistor R1b may be realized via a through-hole 31 on the insulation layer 3.

Further, by configuring each force-sensitive unit in a force sensing module on the two-layer 3D structure, the surface area occupied by the force-sensitive units can be significantly reduced. For example, using a two-layer structure, the surface area occupied by force-sensitive units may be reduced to 60% to 50% of the surface area in a single-layer structure. By stacking the force-sensitive resistor R1a and the force-sensitive resistor R1b in space, the dimension of a force sensing module may be decreased from 4-5 mm (i.e., the dimension of existing force sensing modules) to 2.5 mm, which is smaller than one half of the area touched by a finger, so that the influence on the detection results by varied temperature between force-sensitive units during the finger touch can be avoided.

Figure 7:
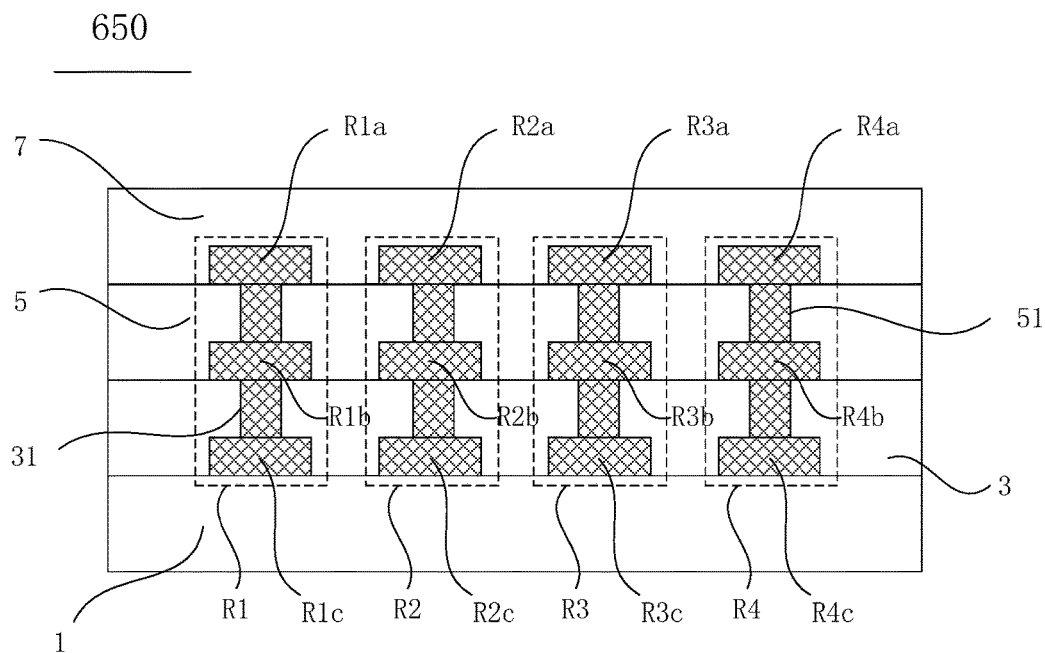
FIG. 7 illustrates another exemplary bridge in a strain gauge of a display panel consistent with disclosed embodiments.

FIG. 7 illustrates another exemplary bridge in a strain gauge of the disclosed display panel. Different from FIG. 4, a force-sensitive unit of the strain gauge 650 in FIG. 7 may include a three-layer resistor structure. That is, the strain gauge 650 may include the first substrate 1, the second substrate 7, force-sensitive resistors (force-sensitive resistors R1a, R2a, R3a, R4a) in the first force-sensitive resistor layer, force-sensitive resistors (force-sensitive resistors R1b, R2b, R3b, R4b) in the second force-sensitive resistor layer, and force-sensitive resistors (force-sensitive resistors R1c, R2c, R3c, R4c) in the third force-sensitive resistor layer.

Further, the force sensing module may include a plurality of force-sensitive units. For example, the disclosed force sensing module may include the first force-sensitive unit R1 (a combination of force-sensitive resistors R1a+R1b+R1c), the second force-sensitive unit R2 (a combination of force-sensitive resistors R2a+R2b+R2c), the third force-sensitive unit R3 (a combination of force-sensitive resistors R3a+R3b+R3c), and the fourth force-sensitive unit R4 (a combination of force-sensitive resistors R4a+R4b+R4c).

In particular, the force-sensitive resistor R1a, the force-sensitive resistor R2a, the force-sensitive resistor R3a, and the force-sensitive resistor R4a may all be disposed on the first force-sensitive resistor layer. The force-sensitive resistor R1b, the force-sensitive resistor R2b, the force-sensitive resistor R3b, and the force-sensitive resistor R4b may all be disposed on the second force-sensitive resistor layer. The force-sensitive resistor R1c, the force-sensitive resistor R2c, the force-sensitive resistor R3c, and the force-sensitive resistor R4c may all be disposed on the third force-sensitive resistor layer.

Further, the first force-sensitive resistor layer and the second force-sensitive resistor layer may be disposed on two sides of the insulation layer 5, respectively, and the force-sensitive resistors on the first force-sensitive resistor layer (force-sensitive resistors R1a, R2a, R3a, and R4a) may be individually connected to the corresponding force-sensitive resistors on the second force-sensitive resistor layer (force-sensitive resistors R1b, R2b, R3b, and R4b) via through-holes 51 on the insulation layer 5.

The second force-sensitive resistor layer and the third force-sensitive resistor layer may be disposed on two sides of the insulation layer 3, respectively, and the force-sensitive resistors on the second force-sensitive resistor layer (e.g., force-sensitive resistor R1b, R2b, R3b, or R4b) may be connected to the corresponding force-sensitive resistors (e.g., force-sensitive resistor R1c, R2c, R3c, or R4c) on the third force-sensitive resistor layer, respectively, via through-holes 31 on the insulation layer 3. The corresponding force-sensitive resistors disposed on different layers may be individually connected in series, forming force-sensitive units (i.e., bridge arms of the bridge) of a force sensing module (i.e., bridge).

Accordingly, by distributing each force-sensitive unit in the force sensing module over the three-layer 3D structure, the surface area occupied by each force-sensitive unit may be significantly reduced. For example, in the three-layer structure, the surface area occupied by the force-sensitive units may be reduced to 45% to 35% of that of a single layer structure. In certain embodiments, each force-sensitive unit may be distributed over a four-layer structure, a five-layer structure, or a six-layer structure, etc.

Figure 8:
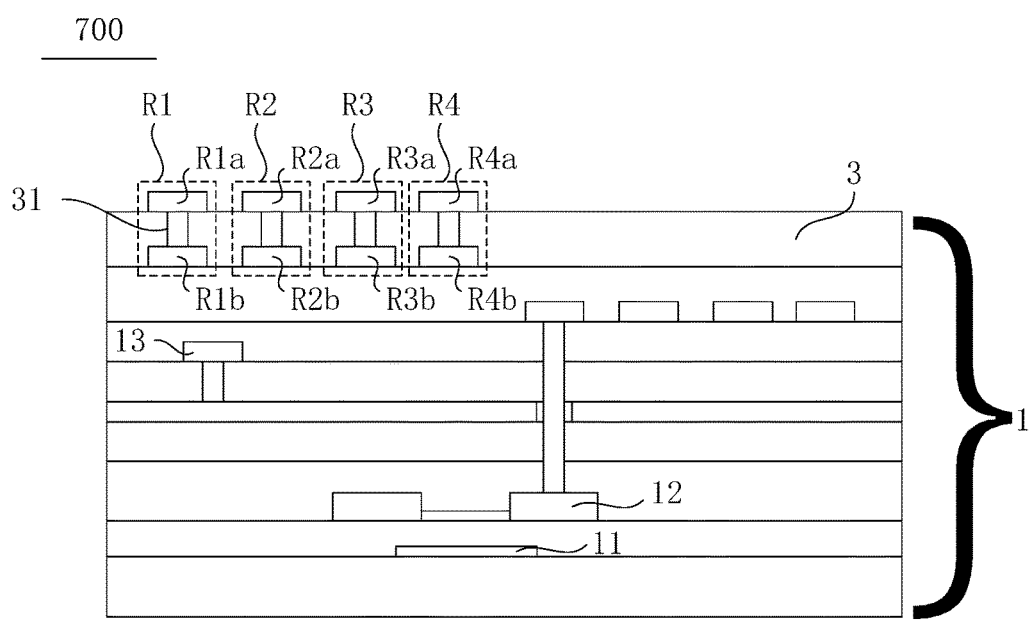
FIG. 8 illustrates an exemplary array substrate for a first embedded bridge in a display panel consistent with disclosed embodiments.

FIG. 8 illustrates an exemplary array substrate for a first embedded bridge in the disclosed display panel. As shown in FIG. 8, the display panel 700 may include an array substrate 1, a color film substrate (not illustrated in FIG. 8) arranged in opposite to the array substrate 1, a plurality of force sensing modules arranged in an array, and a force sensing circuit (not illustrated in FIG. 8).

The force sensing module may be disposed on the array substrate 1. The force sensing module may include the first force-sensitive unit R1 (a combination of R1a+R1b), the second force-sensitive unit R2 (a combination of R2a+R2b), the third force-sensitive unit R3 (a combination of R3a+R3b), and the fourth force-sensitive unit R4 (a combination of R4a+R4b). In particular, the force-sensitive resistor R1a, the force-sensitive resistor R2a, the force-sensitive resistor R3a, and the force-sensitive resistor R4a may all be disposed on the first force-sensitive resistor layer. The force-sensitive resistor R1b, the force-sensitive resistor R2b, the force-sensitive resistor R3b, and the force-sensitive resistor R4b may all be disposed on the second force-sensitive resistor layer. The first force-sensitive resistor layer and the second force-sensitive resistor layer may be disposed on two sides of the insulation layer 3, respectively.

Further, the force-sensitive resistors (R1a, R2a, R3a, and R4a) on the first force-sensitive resistor layer may be individually connected to the corresponding force-sensitive resistors (R1b, R2b, R3b, and R4b) on the second force-sensitive resistor layer via through-holes 31 on the insulation layer 3, forming the force-sensitive units (i.e., bridge arms of the bridges) of the force sensing module (i.e., bridge). That is, the first force-sensitive unit R1, the second force-sensitive unit R2, the third force-sensitive unit R3, and the fourth force-sensitive unit R4 may form the bridge.

The force sensing circuit may determine the total force on a particular force-sensitive unit based on the sum of the force corresponding to the in-plane deformation experienced by the force-sensitive resistor (e.g., force-sensitive resistor R1a, R2a, R3a, or R4a) on the first force-sensitive resistor layer and the force corresponding to the in-plane deformation experienced by the corresponding force-sensitive resistors (e.g., force-sensitive resistor R1b, R2b, R3b, or R4b) on the second force-sensitive resistor layer.

The array substrate 1 in display panel 700 may have a first metal layer that is patterned to be a gate electrode layer 11, a second metal layer that is patterned to be a drain electrode layer 12, and a third metal layer that is patterned to be touch electrode lines 13. In addition, a fourth metal layer and a fifth metal layer may be added. The force-sensitive resistors (R1b, R2b, R3b, and R4b) on the second force-sensitive resistor layer may be obtained by patterning the fourth metal layer; and the force-sensitive resistors (R1a, R2a, R3a, and R4a) on the first force-sensitive resistor layer may be obtained by patterning the fifth metal layer.

Figure 9:
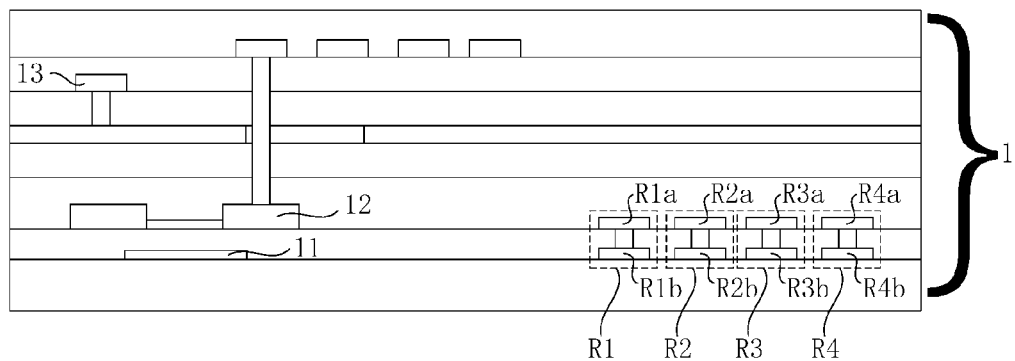
FIG. 9 illustrates an exemplary array substrate for a second embedded bridge in a display panel consistent with disclosed embodiments.

FIG. 9 illustrates an exemplary array substrate for a second type of embedded bridge in the disclosed display panel. As shown in FIG. 9, the array substrate 1 in the display panel 710 may include a first metal layer patterned to be the gate electrode layer 11, a second metal layer patterned to be the drain electrode layer 12, and a third metal layer patterned to be the touch electrode lines 13.

Further, the force-sensitive resistors (R1b, R2b, R3b, and R4b) on the second force sensing layer may be disposed on the same layer as the first metal layer (i.e., on the same layer as the gate electrode layer 11). The force-sensitive resistors (R1a, R2a, R3a, and R4a) on the first force-sensitive resistor layer may be disposed on the second metal layer (i.e., on the same layer as the drain electrode layer 12). The corresponding force-sensitive resistors from different layers may be connected to each other in series via through-holes between the first metal layer and the second metal layer.

Figure 10:
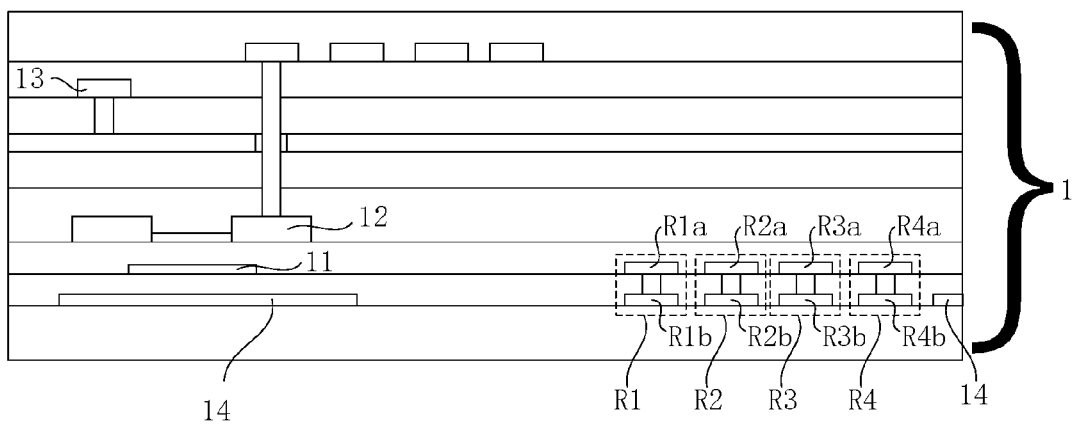
FIG. 10 illustrates an exemplary array substrate for a third embedded bridge in a display panel consistent with disclosed embodiments.

FIG. 10 illustrates an exemplary array substrate for a third embedded bridge in the disclosed display panel. As shown in FIG. 10, the array substrate 1 of the display panel 720 may include, sequentially from bottom to top, a metal light-shielding layer 14, a first metal layer patterned to be the gate electrode layer 11, a second metal layer patterned to be the drain electrode layer 12, and a third metal layer patterned to be the touch electrode lines 13.

Further, the force-sensitive resistors (R1b, R2b, R3b, and R4b) on the second force-sensitive resistor layer may be disposed on the same layer as the metal light-shielding layer 14. The force-sensitive resistors (R1a, R2a, R3a, and R4a) on the first force-sensitive resistor layer may be disposed on the same layer as the first metal layer (i.e., the same layer as the gate electrode layer 11). The corresponding force-sensitive resistors from different layers may be connected to each other in series via through-holes between the first metal layer and the metal light-shielding layer 14.

Figure 11:
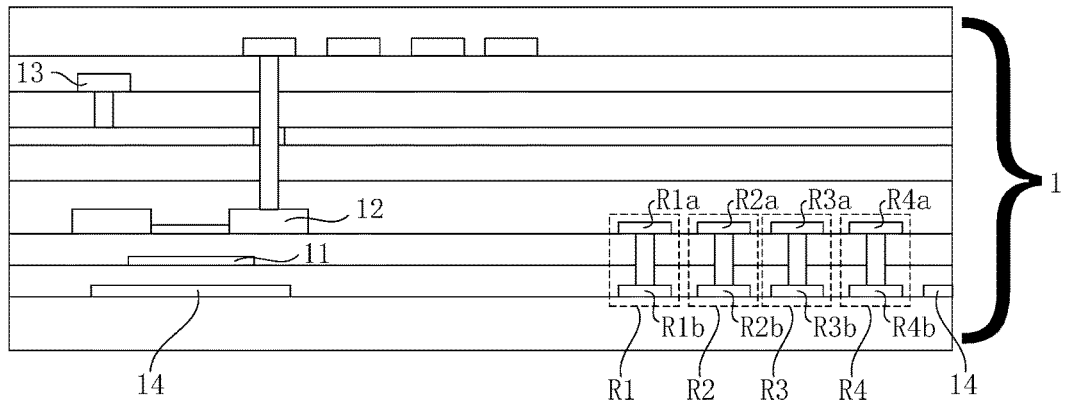
FIG. 11 illustrates an exemplary array substrate for a fourth embedded bridge in a display panel consistent with disclosed embodiments.

FIG. 11 illustrates an exemplary array substrate for a fourth embedded bridge in the disclosed display panel. As shown in FIG. 11, the array substrate 1 of display panel 730 may include, sequentially from bottom to top, a metal light-shielding layer 14, a first metal layer patterned to be the gate electrode layer 11, a second metal layer patterned to be the drain electrode layer 12, and a third metal layer patterned to be the touch electrode lines 13.

Further, the force sensing electrodes (R1b, R2b, R3b, and R4b) on the second force-sensitive resistor layer may be disposed on the same layer as the metal light-shielding layer 14, and the force-sensitive resistors (R1a, R2a, R3a, and R4a) on the first force-sensitive resistor layer may be disposed on the same layer as the second metal layer (i.e., the same layer as drain electrode layer 12), bypassing the first metal layer. The corresponding force-sensitive resistors from different layers may be connected to each other in series via through-holes between the second metal layer and the metal light-shielding layer 14.

Figure 12:
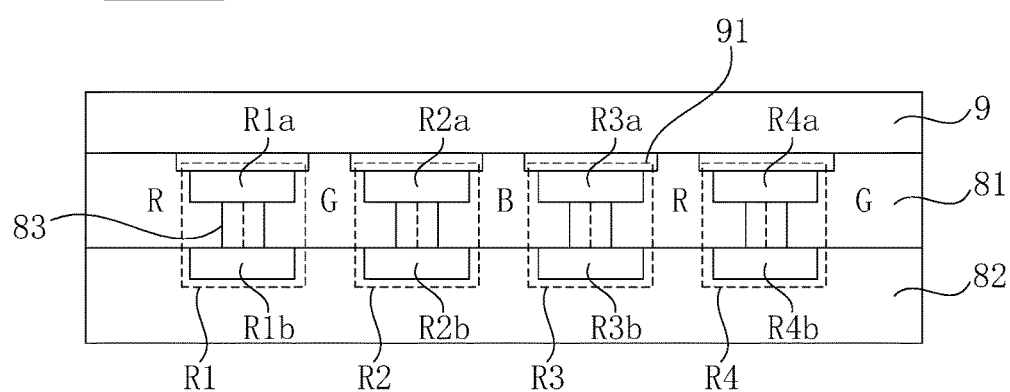
FIG. 12 illustrates an exemplary color film substrate for an embedded bridge in a display panel consistent with disclosed embodiments.

FIG. 12 illustrates an exemplary color film substrate with an embedded bridge in the disclosed display panel. As shown in FIG. 12, the display panel 750 may include an array substrate (not illustrated in FIG. 12), a color film substrate 9 disposed oppositely to the array substrate, a plurality of force sensing modules arranged in an array, and a force sensing circuit (not illustrated in FIG. 12).

The force sensing modules may be formed on one side of the color film substrate 9. A black matrix 91, a color film filter layer 81, and an insulation covering layer 82 may be disposed on the color film substrate 9. The force sensing module may include a first force-sensitive unit R1 (a combination of R1a+R1b), a second force-sensitive unit R2 (a combination of R2a+R2b), a third force-sensitive unit R3 (a combination of R3a+R3b), and a fourth force-sensitive unit R4 (a combination of R4a+R4b).

The force-sensitive resistor R1a, the force-sensitive resistor R2a, the force-sensitive resistor R3a, and the force-sensitive resistor R4a may all be disposed on a first force-sensitive resistor layer. The force-sensitive resistor R1b, the force-sensitive resistor R2b, the force-sensitive resistor R3b, and the force-sensitive resistor R4b may all be disposed on a second force-sensitive resistor layer. The first force-sensitive resistor layer may be sandwiched between the color film substrate 9 and the color film filter layer 81, and the second force-sensitive resistor layer may be sandwiched between the color film filter layer 81 and the insulation covering layer 82.

The force-sensitive resistors (R1a, R2a, R3a, and R4a) on the first force-sensitive resistor layer may be respectively connected in series to the corresponding force-sensitive resistors (R1b, R2b, R3b, and R4b) on the second force-sensitive resistor via through-holes 83 on the color film filter layer 81, forming the force-sensitive units (i.e., bridge arms of the bridges) of the force sensing module (i.e., bridge). That is, the first force-sensitive unit R1, the second force-sensitive unit R2, the third force-sensitive unit R3, and the fourth force-sensitive unit R4 may form the bridge.

The force sensing circuit may determine the total force on a particular force-sensitive unit based on the sum of the force corresponding to the in-plane deformation experienced by the force-sensitive resistor (e.g., force-sensitive resistor R1a, R2a, R3a, or R4a) on the first force-sensitive resistor layer and the force corresponding to the in-plane deformation experienced by force-sensitive resistor (e.g., force-sensitive resistor R1b, R2b, R3b, or R4b) on the second force-sensitive resistor layer. The vertical projection of the black matrix 91 may cover the force-sensitive resistors (R1a, R2a, R3a, and R4a) on the first force-sensitive resistor layer and the force-sensitive resistors (R1b, R2b, R3b, and R4b) on the second force-sensitive resistor layer, so as to avoid the interference to the quality of image display caused by the force-sensitive resistors from the first force-sensitive resistor layer as well as the force-sensitive resistors from the second force-sensitive resistor layer.

Thus, in the display panel 750, each force-sensitive unit in the force sensing module may be distributed over the two-layer 3D structure, such that the surface area occupied by the force-sensitive units can be significantly reduced. For example, the surface area occupied by the force-sensitive units may be reduced to 60% to 50% of the surface area in a single-layer structure.

In certain embodiments, the color film filter layer 81 may include a plurality of color film filters in different colors, the force-sensitive resistors may be sandwiched between color film filters in different colors, so that each force-sensitive unit may be in a four-layered structure, a five-layered structure, or a six-layered structure, etc.

Figure 13:
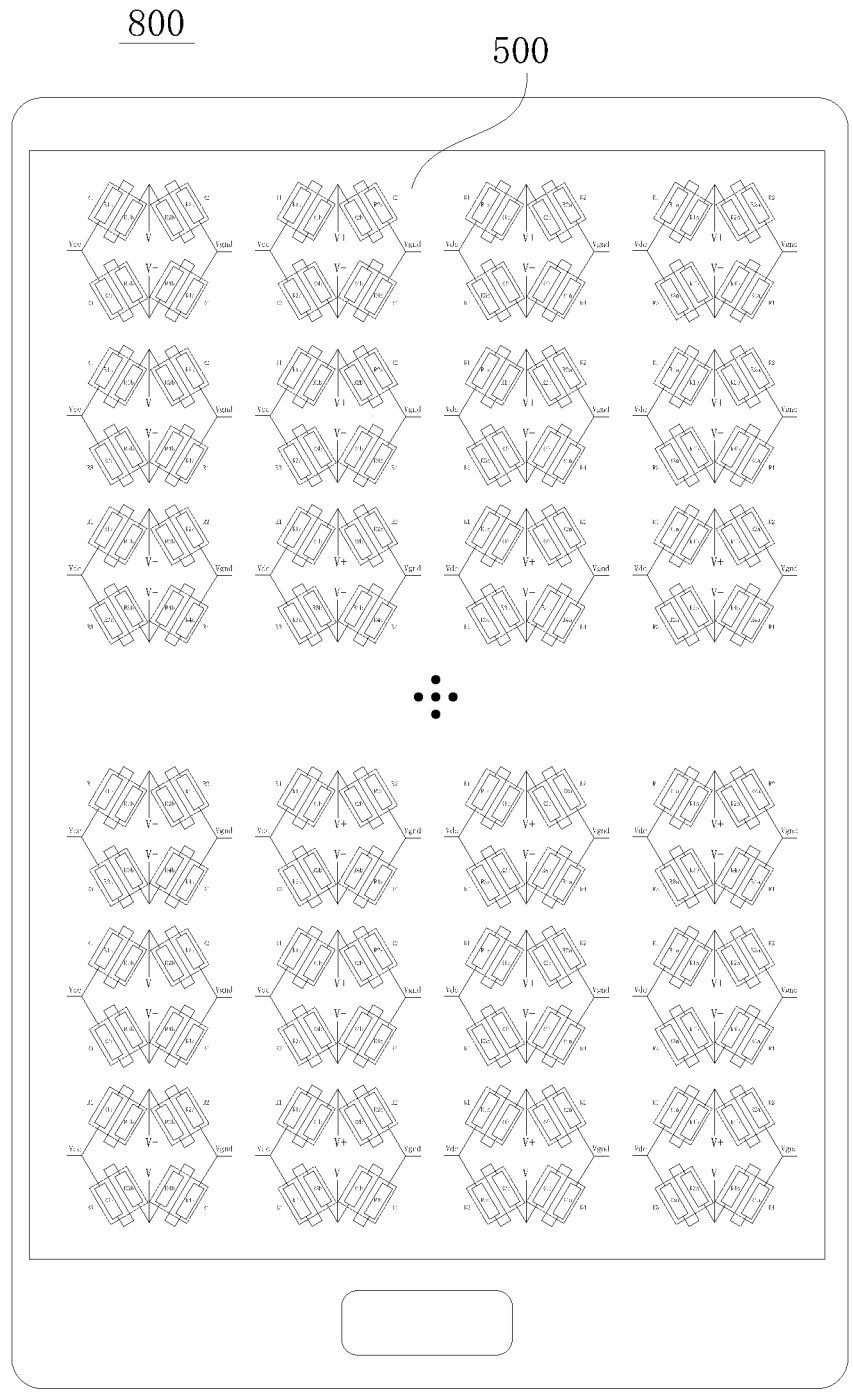
FIG. 13 illustrates an exemplary display device consistent with disclosed embodiments.

FIG. 13 illustrates a top view of an exemplary display device. As shown in FIG. 13, a display device 800 may include a display panel, which may be any display panel in the above disclosed embodiments. The display device may be a cell phone, a desktop, a laptop, a tablet, or an electronic album. The display device 800 may include a plurality of the force sensing modules 500 arranged in an array. A force sensing module 500 may include a plurality of the force-sensitive units, and each force-sensitive unit may include at least two force-sensitive resistors distributed over different layers, such that the length or width of a single force sensing module may be approximately 2.5 mm, smaller than ½ of an area touched by a finger. Thus, the influence on the detection results by uneven temperatures between different force-sensitive units during a finger touch can be avoided.

Accordingly, in various display screen applications, the disclosed display panel uses a strain gauge force sensing bridge with an overlapped structure to significantly reduce the overall dimension of a force sensing module without changing the overall resistance of the bridge. Thus, the negative effects of uneven spatial temperature on the resistive force sensing structure may be reduced, improving the signal-to-noise ratio.

Further, in the disclosed embodiments, the first substrate of the display panel may also include other parts/structures, such as pixel units defined by intersecting scanning lines and data lines, TFT devices, circuit structures, pixel electrodes, and insulation layer(s). The gate electrodes of TFT devices may be connected to the scanning lines, one of the source electrodes or the drain electrodes may be connected to the data lines, and the other one of the source electrodes or the drain electrodes may be connected to the pixel units. Other structures may also be used.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A display panel, comprising:
   a first substrate;
   a second substrate, arranged opposite to the first substrate, including a first metal layer and a second metal layer; and
   at least one group of force sensing modules disposed on one side of the second substrate, wherein:
   each force sensing module includes a plurality of force-sensitive units,
   each force-sensitive unit includes at least two force-sensitive resistors disposed on different layers,
   the at least two force-sensitive resistors are distributed on the first metal layer and the second metal layer, and
   the at least two force-sensitive resistors on different metal layers are connected with each other in series by a via formed between the first metal layer and the second metal layer.

2. The display panel according to claim 1, further comprising
   a force sensing circuit electrically connected to the at least one group of force sensing modules and configured to determine a total force on the force-sensitive unit based on a sum of forces corresponding to in-plane deformation experienced by all force-sensitive resistors in the force-sensitive unit.

3. The display panel according to claim 2, wherein:
   the plurality of force-sensitive units include a first force-sensitive unit, a second force-sensitive unit, a third force-sensitive unit, and a fourth force-sensitive unit; and
   the at least one group of force sensing modules includes a bridge formed by the first force-sensitive unit, the second force-sensitive unit, the third force-sensitive unit, and the fourth force-sensitive unit.

4. The display panel according to claim 3, wherein:
   the bridge is a Wheatstone bridge;
   a first end of the first force-sensitive unit is connected to a first end of the second force-sensitive unit and a first end of a galvanometer;
   a first end of the fourth force-sensitive unit is connected to a first end of the third force-sensitive unit and a second end of the galvanometer;

a second end of the first force-sensitive unit is connected to a second end of the fourth force-sensitive unit to be a first output; and a second end of the second force-sensitive unit is connected to a second end of the third force-sensitive unit to be a second output.

5. The display panel according to claim 2, wherein vertical projections of the force-sensitive resistors in the force-sensitive unit on the different layers have a same texture, shape, and dimension, and the force-sensitive resistors in the force-sensitive unit have same resistance.

6. The display panel according to claim 2, wherein vertical projections of the force-sensitive resistors in the force-sensitive unit on the different layers have different shapes and dimensions.

7. The display panel according to claim 1, wherein the first metal layer is a gate electrode layer, and the second metal layer is a source and drain electrode layer.

8. The display panel according to claim 1, wherein:
the second substrate is an array substrate;
the array substrate further includes a third metal layer, a fourth metal layer and a fifth metal layer;
the third metal layer is a touch electrode line layer;
the force-sensitive resistors are distributed on the fourth metal layer and the fifth metal layer, and
the force-sensitive resistors on different metal layers are connected to each other in series by a via between the fourth metal layer and the fifth metal layer.

9. The display panel according to claim 1, wherein:
the second substrate is an array substrate;
the array substrate further includes a metal light-shielding layer;
the force-sensitive resistors are distributed on the first metal layer and the metal light-shielding layer, and
the force-sensitive resistors on different layers are connected to each other in series between the first metal layer and the metal light-shielding layer.

10. The display panel according to claim 1, wherein:
the second substrate is an array substrate;
the array substrate further includes a metal light-shielding layer;
the force-sensitive resistors are distributed on the second metal layer and the metal light-shielding layer, and
the force-sensitive resistors on different metal layers are connected to each other in series by a via between the second metal layer and the metal light-shielding layer.

11. The display panel according to claim 1, wherein:
the at least one group of force sensing modules is disposed on one side of the first substrate;
the first substrate includes a black matrix, a color film filter layer, and an insulation layer;
the force-sensitive resistors are distributed between the black matrix and the color film filter layer, and between the color film filter layer and the insulation layer.

12. The display panel according to claim 11, wherein vertical projection of the black matrix covers the force-sensitive resistors.

13. The display panel according to claim 11, wherein:
the color film filter layer includes a plurality of color film filters of different colors, and
the force-sensitive resistors are distributed between color film filters of different colors.

* * * * *